United States Patent [19]

Stanmore

[11] 4,339,629
[45] Jul. 13, 1982

[54] JUNCTION BOX FOR HOUSING CABLE CONNECTIONS

[76] Inventor: Leonard D. Stanmore, 20 Gold Finch Ct., Bramalea, Ontario, Canada

[21] Appl. No.: 114,249

[22] Filed: Jan. 22, 1980

[30] Foreign Application Priority Data

Jan. 25, 1979 [CA] Canada .................................. 320293

[51] Int. Cl.³ ............................................... H05K 5/00
[52] U.S. Cl. .................................. 174/50; 70/DIG. 57
[58] Field of Search ................ 174/50, 52 R; 339/36, 339/37, 39; 70/DIG. 57

[56] References Cited

U.S. PATENT DOCUMENTS 3,760,130 9/1973 Ross ................................. 338/220 X
3,784,727 1/1974 Haubein ............................. 174/50 X

FOREIGN PATENT DOCUMENTS 1021049 12/1957 Fed. Rep. of Germany ........ 174/50
934579 8/1963 United Kingdom ............. 174/65 R

*Primary Examiner*—B. A. Reynolds
*Assistant Examiner*—D. A. Tone
*Attorney, Agent, or Firm*—Weldon F. Green

[57] ABSTRACT

In an improved junction box for housing cable connections or the like including in combination a receptacle adapted to house cable connections or the like and having an opening thereinto; a closure lid for releasably closing said opening, said closure lid presenting an aperture therethrough for the coaxial registration therewithin of a screw threaded connector for connecting said closure lid to said receptacle, and a locking terminator coaxially overlying said aperture outwardly of said closure lid which threadedly lockingly co-operates with the screw threaded connector in the region remote from said receptacle so as to isolate access to the screw threaded connector and releasably secure the closure lid to the receptacle; said locking terminator requires a special key so as to allow it to be removed from said screw threaded connector.

13 Claims, 4 Drawing Figures

JUNCTION BOX FOR HOUSING CABLE CONNECTIONS

FIELD OF INVENTION

This invention relates to improvements in junction boxes for housing cable connections and more particularly to improvements in securing a closure lid to a receptacle in such junction boxes by utilizing a locking terminator to prevent unauthorized tampering of the cable connections within the junction box. The junction box can be used for housing cable television connections, or indeed other connections in electrical signal transmission.

BACKGROUND OF THE INVENTION

Nowadays, consumers generally have to pay for certain electrical signals, notably, cable television signals. Normally the signal transmission cable has been installed in the premises but is disconnected unless connection is requested by the homeowner. Upon request of the homeowner for signals, a workman would attend at the premises to effect the connection. To prevent unauthorized connection or otherwise tampering with said connection, complicated locking mechanisms have been proposed. The available locking mechanisms now used in the trade generally present rather complicated operating procedures to even the authorized workman doing the connection or disconnection, and accordingly impair the working efficiency of the workman.

The following United States and Canadian patents illustrate a number of alternative proposals which will serve as background to those structures embodying the invention to be described and illustrated herein namely:

| U.S. Pat. Nos. | |
|---|---|
| 3,617,811 | 3,676,744 |
| 3,619,476 | 3,847,463 |
| 3,621,478 | 3,951,490 |
| 3,641,464 | 4,066,838 |
| 3,760,130 | |
| Canadian Patents | |
| 676,424 | 989,053 |
| 696,488 | 984,042 |
| 705,982 | |

THE OBJECTS OF THE INVENTION

The principal object of this invention is to provide an improved junction box for housing cable connection and more particularly to provide improvements in securing a closure lid to a receptacle in such boxes by utilizing a locking terminator which isolates the access to the connection between the closure lid and the receptacle, and which requires a special key to allow it to be removed.

It is also an object of this invention to provide a simple but effective locking mechanism as compared with those presently used.

Still another important object is to provide a substantially tamper-proof junction box for preventing unauthorized access or theft of television cable.

Another very important object is to provide a weather-proof junction box for housing cable connections.

A further object of this invention is to provide an improved locking mechanism which is easily assembled, rugged in construction and economical to manufacture.

FEATURES OF THE INVENTION

It is a feature of this invention to provide for a substantially tamper-proof junction box for housing cable connections or the like by providing in combination with a receptacle having an opening thereinto and a closure lid for releasably closing the opening, a connecting device for securing the closure lid to the receptable so as to close the opening, including a locking terminator or the like presented exteriorally to the box for coaxial orientation with the connecting device releaseably lockingly engageable with the connecting device so as to isolate access to the connecting device during the axial locking engagement of the locking terminator with the connecting device which requires a special key so as to allow the locking terminator to be removed.

More particularly, the connecting device includes a screw threaded connector for releasably connecting the closure lid to the receptacle which is releasably lockingly engageable with the locking terminator.

It is another feature that the closure lid is provided with an aperture therethrough for the axial registration therewithin of the screw threaded connector for releasably connecting the closure lid to the receptacle such that the locking terminator overlies the aperture axially outwardly of the closure lid and threadedly lockingly co-operates with the screw threaded connector in the region axially outwardly from the screw threaded connector and remote from the receptacle so as to releasably isolate the access to the screw threaded connector during axial locking engagement of the locking terminator with the screw threaded connector and releasably secure the closure lid to the receptacle.

The screw threaded connector is carried by the closure lid and extends axially interiorally into the box to axially engage with a screw nut embedded within a sleeve member carried by the receptacle, and has a configuration to generally present a screw threaded stem which connects the closure lid to the receptacle.

In this embodiment the receptacle consists of a bottom wall formation presenting peripheral upstanding side wall formations so as to define a cavity with an opening at the top thereof. One of side wall formations presents a hole therethrough and a conduit adapted to be retained by said hole, including cable passing through the conduit into the cavity for connection therein. The bottom wall formation centrally carries the screw nut embedded within the sleeve member which projects axially upwardly.

More particularly, it is a feature to provide a covering lid presenting a centrally located recess formation and an aperture within the confines of the recess formation which coaxially aligns with the screw nut embedded within the sleeve member carried by the bottom wall formation whenever the closure lid closes the opening. The screw threaded connector coaxially projects through the aperture, is carried by the recess formation, and extends axially interiorally into the box to releasably engage with the screw nut embedded within the sleeve member carried by the bottom wall formation. The locking terminator is presented exteriorally to the closure lid, into the recess formation and coaxially overlies the aperture outwardly of the recess formation so as to coaxially threadedly co-operate with the screw threaded connector in the region remote from the bottom wall formation, thereby isolating access to the screw threaded connector and securing the closure lid to the bottom wall formation.

The screw threaded connector in the preferred embodiment has a screw threaded tube member which includes a shoulder formation and a screw adapted to be inserted into the screw threaded tube member and retained by the shoulder formation so as to releasably engage with the screw nut embedded within the sleeve member carried by the bottom wall formation.

Another feature of this invention resides in a snap cover cap presented exteriorly to the closure lid and removably attachable thereto so as to conceal said locking terminator against moisture.

A further feature of this invention resides in the fact that the receptacle, closure lid, and snap cover cap are made of plastic impermeable to moisture.

These and other objects and features will become apparent in the following description to be read in conjunction with the sheet of drawings in which.

DETAILED DESCRIPTION OF THE PREFERRED EMBODIMENT

Figure 4:
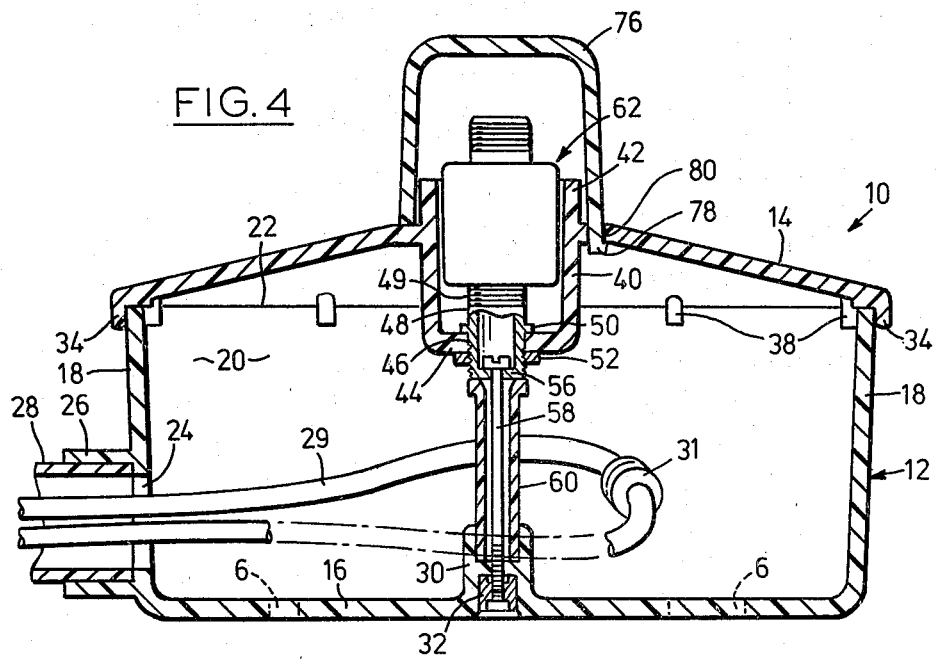
FIG. 4 is a cross-sectional view of the receptacle with the covering lid and snap cover cap in place and the locking terminator engaged with the screw threaded tube taken along the lines 4—4 of FIG. 2.

The junction box indicated at 10 in FIG. 4 includes a receptacle 12 and a closure lid 14.

Receptacle 12 has a conventional generally cuboid-shaped configuration including a bottom wall formation 16 presenting peripheral upstanding side wall formations 18 which define a cavity 20 having an opening 22 at the top thereof. The bottom wall formation 16 of receptacle 12 is provided with a plurality of mounting holes 6 which are adapted to receive screws or nails (not shown) for securing the receptacle in position on a supporting surface such as a wall or ceiling.

Figure 1:
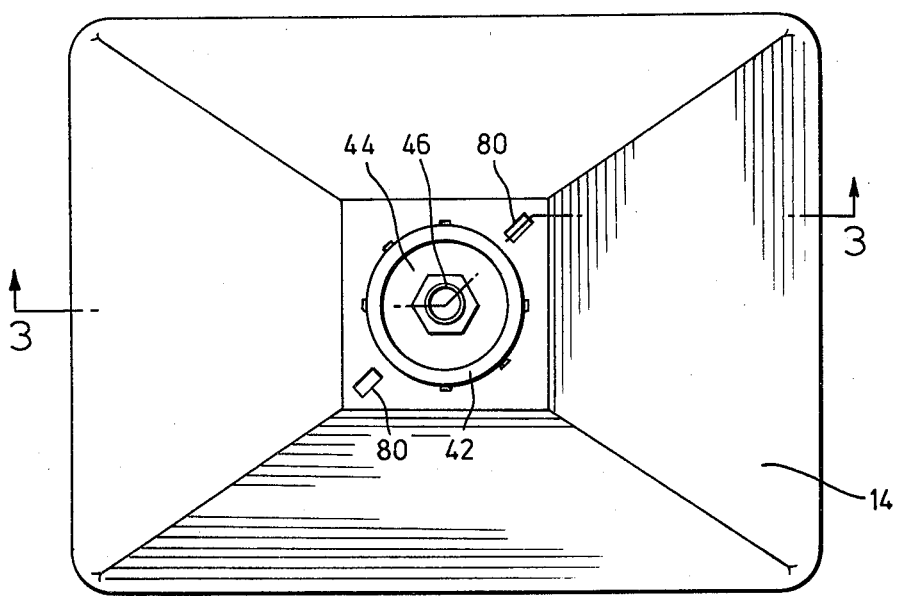
FIG. 1 is a top plan view of the closure lid.
Figure 2:
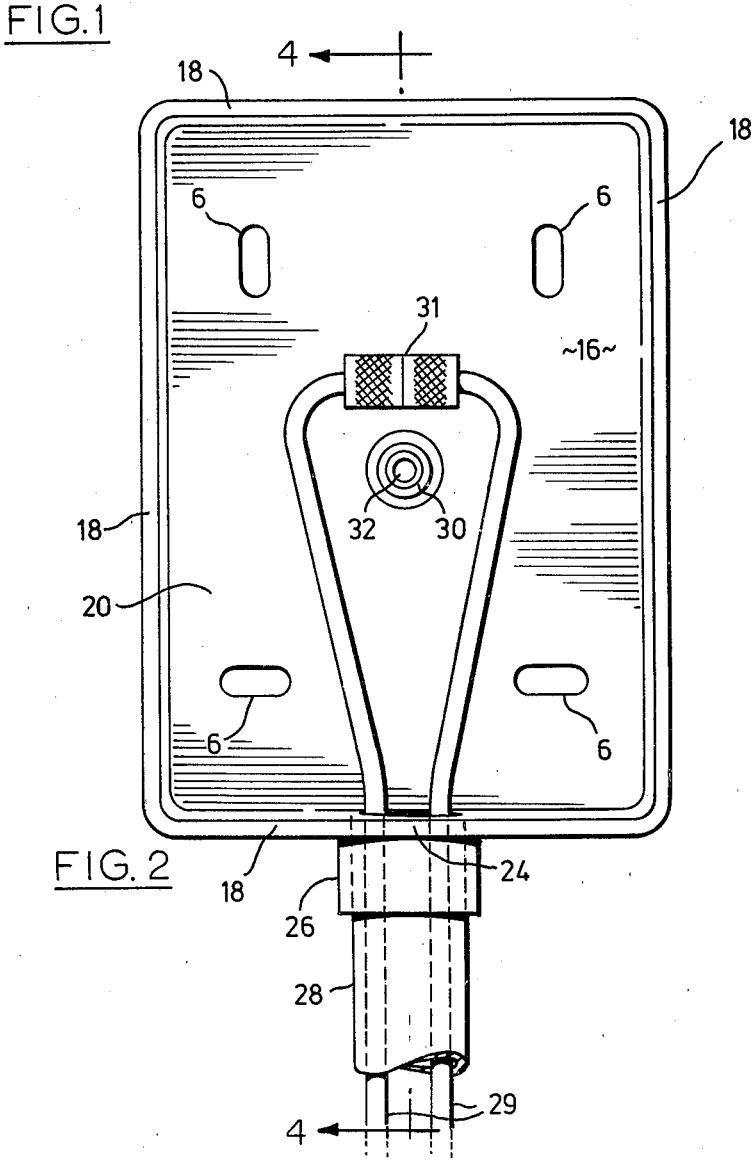
FIG. 2 is a top plan view of the receptacle with the covering lid removed.

FIGS. 2 and 4 indicate that one of the side wall formations 18 has an aperture 24 therethrough which is coaxially surrounded by a sleeve member 26 projecting exteriorly from one of the side wall formations 18. A conduit 28 fits within sleeve member 24 and is fixedly retained therewithin by using either universal adhesive or standard solvent cement.

The conduit 28 carries two television cables 29, one of which carries the television signal, and the other of which is connected to a television (not shown). The two television cables 29 carried within conduit 28 extend into the cavity 20 and may be connected therein by a connector 31, by an authorized workman, if the consumer has paid for the cable television service. Otherwise cables will be disconnected within the cavity 20 by an authorized workman should a consumer not pay for the cable television service.

It is understood that aperture 24 may be located within any one of the side wall formations 18, or for that matter within bottom wall formation 16. It is also evident that receptacle 12 may be installed within a wall containing television cable leading into aperture 24 and extending into cavity 20 for connection therein; in which case it would be unnecessary to use conduit 28.

Bottom wall formation 16 also presents a centrally located sleeve member 30 projecting axially inwardly into cavity 20, and includes a screw nut 32 embedded therein. The sleeve member 30 and screw nut 32 serve to anchor the locking mechanism as will be described herein.

The closure lid 14 is adapted to overlie cavity 20 and close opening 22 as illustrated in FIG. 4. The closure lid 14 is provided with a peripheral lip 34 and projections 38 located on the inside surface of covering lid 14. The peripheral lip 34 embraces the rim 36 of side wall formations 18 and provides for a moisture-proof seal. Projections 38 facilitate the proper registration of the upper portion of side wall formations 18 with covering lid 14.

It will be apparent that projections 38 in conjunction with peripheral lip 34 reinforce the stability of the junction box as they tend to prevent the side wall formations 18 from buckling should a force be applied against side wall formations 18.

Covering lid 14 is provided with a generally cylindrically shaped recess formation 40 including bottom recess wall formation 44 and outwardly projection rim formation 42. The bottom recess wall formation 44 has an axially aligned aperture as at 46 which coaxially aligns with sleeve member 30 and its embedded screw nut 32 when closure lid 14 closes opening 22.

Aperture 46 coaxially receives screw threaded tube member 48 which is carried by the bottom recess wall formation 44 of recess formation 40 presented by covering lid 14.

Figure 3:
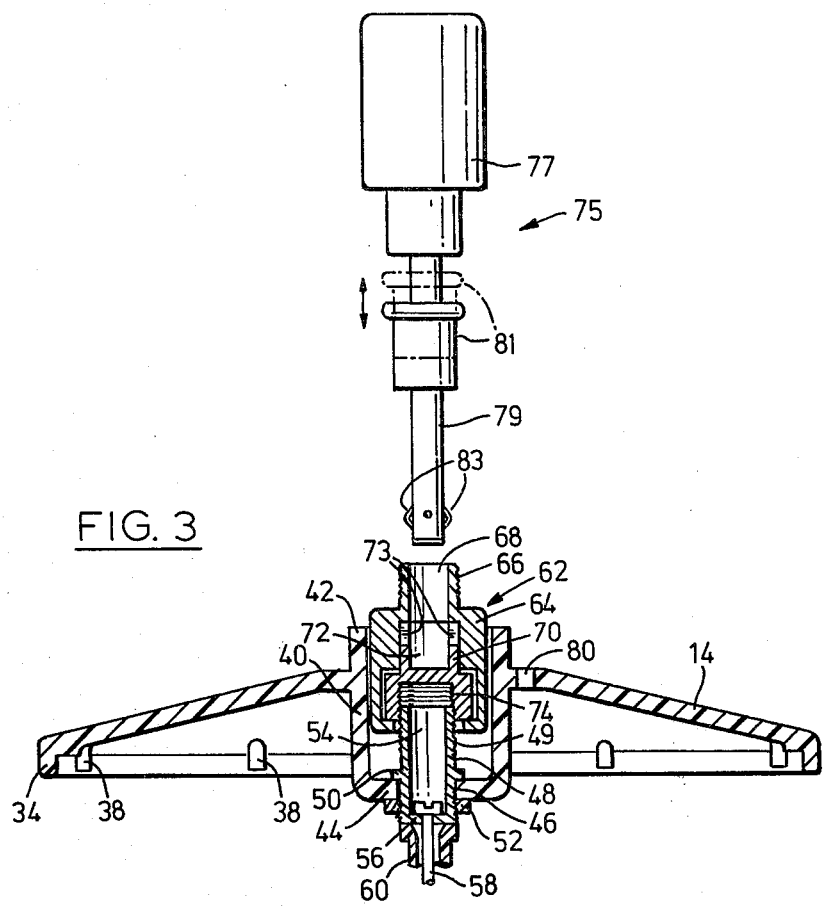
FIG. 3 is a cross-sectional view of the covering lid taken along the lines 3—3 in FIG. 1 revealing the locking terminator and locking terminator key.

The outside diameter of screw threaded tube member 48 is provided with screw threads 49 and a shoulder formation 50 which bears against the bottom recess wall formation 44. Screw threaded tube member 48 is anchored within aperture 46 of bottom recess wall formation 44 by means of a threaded nut 52 as illustrated in FIGS. 3 and 4 of the drawings. The inner bore 54 of screw threaded tube member 46 is provided with shoulder formation 56 which presents a bearing surface for seating the head of a screw 58.

In the preferred embodiment the screw threaded tube member 48 consists of an empty F81 connector typically used for splicing the ends of a television cable which has been cut.

It is apparent from FIG. 4 that the screw threaded tube member 48 is coaxially aligned with sleeve member 30 and its embedded screw nut 32.

The closure lid 14 is connected to receptacle 12 by coaxially inserting a screw 58 into the bore 54 of screw threaded tube member 48, the screw 58 being compatibly engageable with the screw nut 32 embedded in sleeve member 30. By inserting a standard narrow slot-headed screw driver (not shown) into the bore 54 of screw threaded tube member 48 the screw 58 may be axially displaced into the screw nut 32. In this manner, the closure lid 14 may be connected to the bottom wall formation 16, of receptacle 12. An insert post 60 registers within sleeve member 30 as shown in FIG. 4 which not only acts as a guide for screw 58 but prevents over tightening of the screw 58.

The closure lid 14 may be removed from receptacle 12 by inserting a standard narrow slot-headed screw driver (not shown) into the bore 54 of screw threaded tube member 48, and disengaging screw 58 axially outwardly from screw nut 32. Once closure lid 14 is removed from receptacle 12 the opening 22 permits entry into cavity 20, and the cables 29 therewithin may be connected or disconnected by engaging or disengaging connector 31. Insert post 60 can be manually withdrawn from sleeve member 30 so as to remove its obstruction within cavity 20 and facilitate the connection or disconnection of cable 29 within cavity 20.

The opening 22 may be closed by inserting insert post 60 into sleeve member 30, placing covering lid 14 over receptacle 12 as shown in FIG. 3, and inserting screw 58 into bore 54 of screw threaded tube member 48 and engaging same with screw nut 32 by means of a standard narrow slot-headed screw driver (not shown).

Screw threaded tube member 48 and screw 58, have a configuration generally presenting a threaded post member which connects closure lid 14 to bottom wall formation 16 of receptacle 12.

The access to screw 58 is isolated from access by a locking terminator which is axially operable generally indicated as 62 in FIGS. 3 and 4 which releasably lockingly engages with screw threaded tube member 48. It is understood that the words locking terminator and the words tap lock are used interchangeably by persons skilled in the trade.

The internal structure of locking terminator 62 is illustrated in FIG. 3, and includes cylindrical shell 64 having threaded portions 66 and keyhole 68, and an internal cylindrical member 70 coaxially and interiorally retained within the cylindrical shell member 64. Cylindrical member 70 includes an upper key receiving portion 72 coaxially aligned with keyhole 68, and an internally threaded bore section 74 which is compatibly lockingly engageable with the threaded portion 49 of screw threaded tube member 48 and anchored against dislodgement thereto. The upper key receiving portion 72 presents key receiving slot 73.

It is apparent from FIG. 3 that cylindrical shell member 64 and internal cylindrical member 70 are freely rotatable relative to each other. Accordingly, the only way in which the internally threaded bore section 74 of locking terminator 62 can axially engage with the threaded portion 48 of screw threaded tube member 46 is by using a locking terminator key generally indicated as 75 in FIG. 3. Not only does locking terminator 62 isolate the access to the screw 58 but it also isolates and shields the threaded post comprising of tube member 48 and screw 58 against unauthorized access and thereby renders the closure lid 14 inseparable from receptacle 12.

The locking terminator key 75 includes a handle 77, a shaft 79 and a manually displaceable shank portion 81 mounted upon shaft 79. The shank portion 81 is displaceable between two limiting positions as shown in FIG. 3. When the shank portion 81 is in its lower-most position the shaft 79 presents slot engaging projections 83. When the shank portion 81 is in its upper-most position as indicated by the hidden lines in FIG. 3 the slot engaging projections are drawn into the shaft 79 so that the shaft 79 of locking terminator key 75 can be inserted into keyhole 68. The shank portion 81 may then be displaced by its lower-most position so that shaft 79 presents slot engaging projections 83 which engage with key receiving slot 73 presented by the key receiving portion 72 of internal cylindrical member 70.

The locking terminator 75 is then revolved which displaces the internal cylindrical member 70 about screw threaded tube 48 and causes the internally threaded bore section 74 to axially mesh with the threaded portion 49 of screw threaded tube member 48, and to be tightly threaded thereto. The rotating action of the internally threaded bore section 74 about the threaded portion 48 of screw threaded tube member 46 axially displaces the locking terminator 68 closer toward the bottom recess wall formation 44, effectively, lockingly isolating and barring access to screw 58. The locking terminator key 75 may then be pulled away and removed from the locking terminator 62.

The locking terminator 62 can only be removed by utilizing a locking terminator key 75; for once the internal cylindrical member 70 is tightly meshed to threaded portion 48, any tampering with cylindrical shell member 64 will cause the cylindrical shell member 64 to freely rotate about the inner cylindrical member 70 without unthreading the internally threaded bore section 74 from threaded portion 48. In this way the locking terminator means is anchored against dislodgement to screw threaded tube member 48. Therefore locking terminator 62 effectively secures the closure lid 14 to receptacle 12.

The locking terminator and locking terminator key 75 in the preferred embodiment described herein have features well known to persons skilled in the field. It is to be understood that there are other conventional locking terminators and locking terminator keys equivalent to that described above. In particular, conventional locking terminator keys are available which engage with the threaded portion 66 of cylindrical shell 64 as well as the key receiving portion 72 of cylindrical member 70.

Locking terminator 62 is concealed by a snap cover cap 76 which is releaseably attachable to closure lid 14 as illustrated in FIG. 4. Snap cover cap 76 is adapted to embrace the projecting rims 42 of recess formation 40 so as to conceal tap lock 62. Snap cover cap 76 presents two projecting legs 78 which snap into two slots 80 provided in the closure lid 14.

Once the projecting legs 78 have snapped into the slots 80 of closure lid 14 the snap cover cap is firmly attached to the closure lid 14. If the snap cover cap is to be removed this can be done by using side cutters or a knife (not shown) and cutting the upper projecting legs 78.

The snap cover cap 76 prevents moisture from coming into contact with the locking mechanism.

The snap cover cap 76 may be color coded to conveniently indicate to the workman whether the cable 29 is connected or disconnected.

In addition, the closure lid 14 and receptacle 12 are made of plastic impermeable to moisture rendering the junction box 10 suitable for outdoor installation.

Although the preferred embodiments as well as the operation have been specifically described in relation to the drawings, it should be understood that variations of the preferred embodiment could easily be anticipated and achieved by a skilled man in the trade without departing from the spirit of this invention and accordingly this invention should not be understood to be limited to the exact form revealed in the drawings.

What I claim is:

1. In a junction box including receptacle means for housing cable connections and having an opening thereinto; separable closure means for closing said opening; and means for locking said closure means to said receptable means against separation, with said closure means closing said opening; said locking means including threaded post means for connecting said closure means to said receptacle means, and including separable locking terminator means presented exteriorily to said box selectively operable for axial threadable engagement and disengagement with said threaded post means, whereby said locking terminator means can be anchored against dislodgement to said threaded post means during said threaded engagement therewith so as to shield said threaded post means against unauthorized access and thereby render said closure means inseparable from said receptable means.

2. In a junction box as claimed in claim 1 wherein one of said closure means or said receptable means includes aperture means therein, and wherein said threaded post means is carried by said other one of said closure means or said receptacle means and extends axially for registration with said aperture means presented by said other one of said closure means or said receptable means, with said closure means closing said access opening; and wherein said locking terminator means overlies said aperture means outwardly of said box and is selectively operable for axial threadable engagement and disengagement with said threaded post means, whereby said locking terminator means can be anchored against dislodgement to said threaded post means during said threaded engagement therewith so as to shield said threaded post means against unauthorized access and thereby render said closure means inseparable from said receptable means.

3. In a junction box as claimed in claim 1 wherein said aperture means is presented by said closure means and said threaded post means is carried within the perimeter of said aperture means of said closure means and extends axially inwardly into said box to axially releasably engage with threaded anchoring means carried by said receptacle means so as to interconnect said closure means to said receptacle means.

4. In a junction box including receptacle means for housing cable connections and having an opening thereinto; separable closure means for closing said opening, and with one of said receptacle means and closure means including aperture means therein; and means for releasably locking said closure means to said receptacle means against separation, with said closure means closing said opening; said releasably locking means including threaded means for interconnecting said receptacle means and said closure means, and with said threaded means presented within the perimeter of said aperture means, and including releasably locking terminator means overlying said aperture means outwardly of said box and selectively operable for axial threadable engagement and disengagement with said threaded means, whereby said locking terminator means can be anchored against dislodgement to said threaded means during said threaded engagement therewith so as to shield said threaded means against unauthorized access and thereby render said closure means inseparable from said receptacle means.

5. A junction box as claimed in claims 1 or 2 in which said closure means includes snap cover cap means removable attachable thereto for concealing said locking terminator means.

6. A junction box as claimed in claim 5 in which said receptacle means, said closure means and said snap cover cap means are made of plastic impermeable to moisture.

7. In a junction box for housing cable connections including in combination:

(a) a bottom wall formation presenting peripheral upstanding side wall formations defining a cavity with an opening at the top thereof, one of said wall formations presenting a hole therethrough;
(b) conduit means adapted to be retained by said hole, including cable means passing through said conduit means into said cavity for connection therein;
(c) tapped anchoring means projecting axially upwardly and centrally from said bottom wall formation;
(d) closure means for releasably closing said opening, said closure means including a centrally located recess formation and aperture means within the confines of said recessed formation, whereby said aperture means coaxially align with said tapped anchoring means when said closure means closes said opening;
(e) threaded post means coaxially projecting through said aperture means and carried by said recess formation, said threaded post means extending axially interiorly into said box, releasably engagable with said tapped anchoring means so as to connect said closure means to said bottom wall formation;
(f) locking terminator means presented exteriorly to said closure means, into said recess formation and overlying said aperture means coaxially outwardly of said recess formation so as to threadedly lockingly (co-operate) engage with said threaded post means in the region axially outwardly from said threaded post means and remote from said bottom wall formation, (thereby barring) so as to isolate said threaded post means from access during axial locking engagement at said locking terminator means with (to) said threaded post means and thereby secure (securing) said closure means to said bottom wall formation;
(g) snap cover cap means presented exteriorally to said closure means, removeably attachable thereto, so as to conceal said locking perimeter means.

8. A junction box as claimed in claim 7 wherein said bottom wall formation presents a plurality of mounting holes for mounting said junction box onto a surface.

9. A junction box as claimed in claim 7 wherein said snap cover cap is color-coded to signal connection or disconnection of said cable within said box.

10. A junction box as claimed in claim 7 wherein said threaded post means includes screw threaded tube means coaxially carried by said recess formation and including connecting means removeably and coaxially disposed within said screw threaded tube means for releasably connecting said screw threaded tube means to said anchoring means.

11. A junction box as claimed in claim 10 wherein said screw threaded tube means include a shoulder formation for retaining said connecting means.

12. A junction box as claimed in claim 8 wherein said connecting means comprised a screw adapted to be coaxially inserted into said screw threaded tube means, retained by said shoulder formation, and engageable with said anchoring means so as to connect said closure means to said bottom wall formation.

13. A junction box as claimed in claim 12 wherein said tapped anchoring means comprises a sleeve member with an embedded screw nut releasably engageable with said screw.

* * * * *